United States Patent
Donnelly

(10) Patent No.: US 6,820,365 B1
(45) Date of Patent: Nov. 23, 2004

(54) ARTIFICIAL FISHING LURE WITH INTERCONNECTING TUMBLERS

(76) Inventor: Dewayne Donnelly, 1226 Patricia St., #3, Simi Valley, CA (US) 93065

( * ) Notice: Subject to any disclaimer, the term of this patent is extended or adjusted under 35 U.S.C. 154(b) by 0 days.

(21) Appl. No.: 10/465,720

(22) Filed: Jun. 18, 2003

(51) Int. Cl.⁷ .............................................. A01K 85/12
(52) U.S. Cl. .................................. 43/42.12; 43/42.14
(58) Field of Search ........................... 43/42.12, 42.13, 43/42.14

(56) References Cited

U.S. PATENT DOCUMENTS

| | | |
|---|---|---|
| 1,313,476 A | 8/1919 | Ewert |
| 1,842,127 A | 1/1932 | Sticket et al. |
| 1,997,802 A | 4/1935 | Meyer |
| 2,389,423 A * | 11/1945 | Evans .................. 43/42.12 |
| 2,467,151 A | 4/1949 | Nordquist |
| 2,526,077 A | 10/1950 | Jurczok |
| 2,688,205 A * | 9/1954 | Brown .................. 43/26.2 |
| 2,714,778 A | 8/1955 | Megerle |
| 4,135,323 A * | 1/1979 | Esten .................. 43/42.16 |
| 4,881,341 A * | 11/1989 | Dickey et al. .......... 43/42.12 |
| 4,891,901 A * | 1/1990 | Baker, Jr. ............. 43/42.11 |
| 5,050,334 A * | 9/1991 | Standish, Jr. .......... 43/42.13 |
| 6,018,901 A * | 2/2000 | DuBois ................. 43/42.19 |
| 6,176,035 B1 * | 1/2001 | Somogyi ................ 43/42.14 |

* cited by examiner

Primary Examiner—Michael J. Carone
Assistant Examiner—Bret Hayes
(74) Attorney, Agent, or Firm—Jack C. Munro

(57) ABSTRACT

An artificial fishing lure which has a pair of interconnected tumblers. The tumblers are to rotate when the fishing lure is moved through water which is to be an attractant to a fish to induce striking of the lure. By the interconnecting of the tumblers, the tumblers are always rotated at the same speed but in opposite directions thereby balancing the movement of the tumblers on the lure assuring that the lure always moves in an upright position through the water and does not turn over which would twist the fishing line to which the lure is attached.

4 Claims, 1 Drawing Sheet

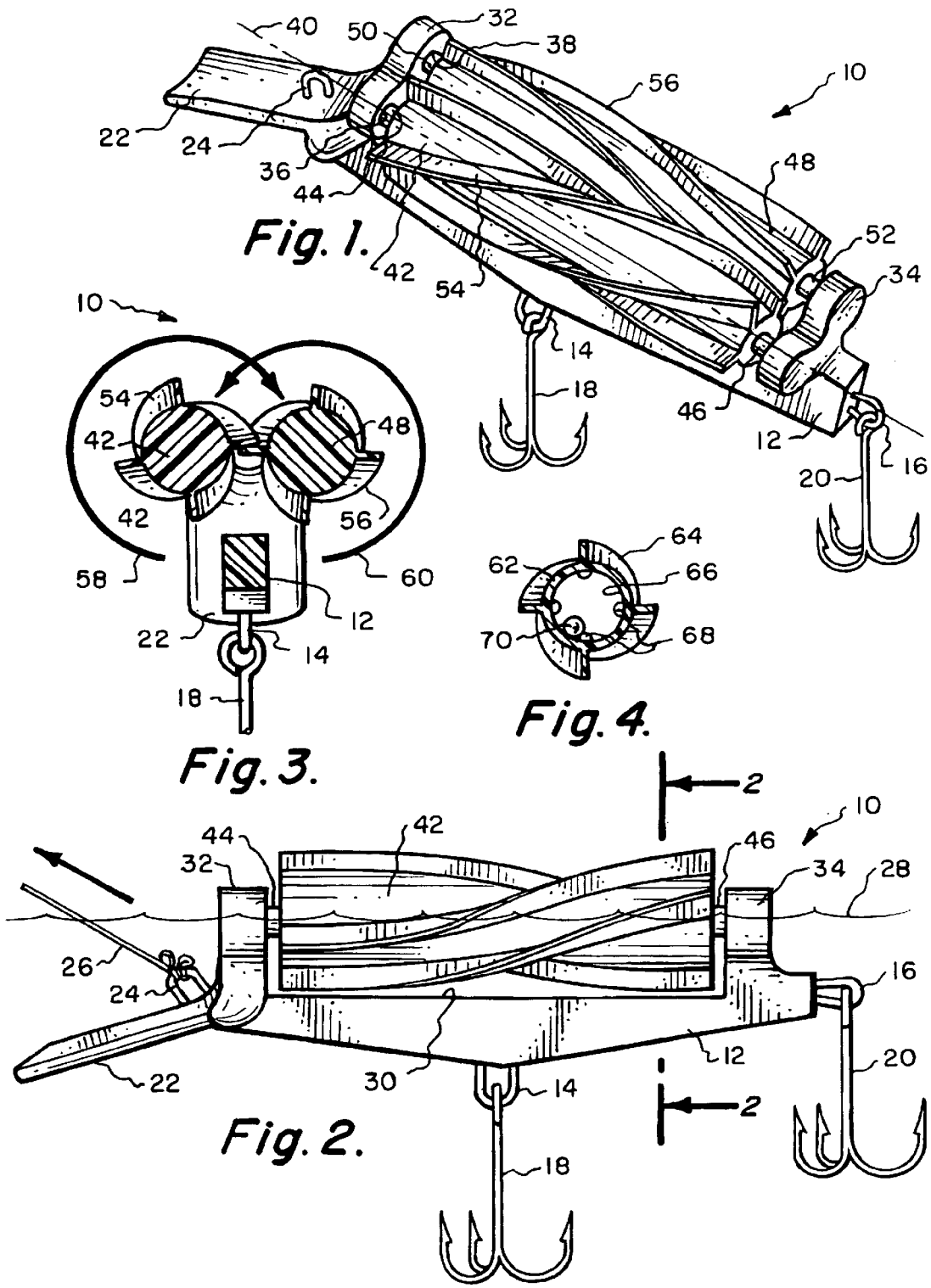

ARTIFICIAL FISHING LURE WITH INTERCONNECTING TUMBLERS

BACKGROUND OF THE INVENTION

1. Field of the Invention

The field of this invention relates to the sport of fishing and more particularly to an artificial fishing lure which is to be attractive to fish to induce a fish to strike the lure.

2. Description of the Related Art

In fishing, it is common to use an artificial lure rather than live bait. Typically, an artificial lure is applied to an end of a fishing line and then is cast at a spaced location from the fisherman and then reeled back to the fishing pole by winding of the fishing line on a fishing reel. Also, the fishing lure can be used when trolling, that is having the fishing lure move through water as a boat is moved on the water.

There is a significant amount of prior art having to do with fishing lures and even fishing lures which includes rotatable tumblers. The rotatable tumblers are caused to rotate as the fishing lure is moved through water. Typically, the tumblers will either produce some form of noise that might function to be an attractant to fish and/or will include some color which will also be attractive to fish. Also, the movement of the tumblers functions as an attractant to fish.

In the prior art, these tumblers may rotate at different speeds and frequently rotate in the same direction. This will cause the fishing lure to turn over and over and twist the fishing line. As a result, the fishing line will become knotted and also the turning over of the fishing lure becomes non-realistic to the fish thereby not functioning as an attractant to the fish.

It would be desirable to design a fishing lure so that as it is moved through water it will remain in the same upright position thereby resembling the movement of a small bait fish through water and will be attracted to a larger fish to strike the lure.

SUMMARY OF THE INVENTION

A first embodiment of artificial fishing lure which has an elongated base which has a mounting chamber. The base is connected to an attachment which is designed to connect with a fishing line which is to be used to move the base through water. The base also has a fish hook mounted thereon. The elongated housing has a longitudinal center axis which is parallel to the direction of movement of the fishing lure through water. The mounting chamber is formed between a pair of mounting stanchions with a single stanchion located at each longitudinal end of the mounting chamber. Each mounting stanchion has a first recess and a second recess. The first recesses have mounted therebetween a first tumbler which is rotatable relative to the stanchion. A second tumbler is rotatably mounted between the second recesses. The rotational axes of each of the tumblers is aligned longitudinally and parallel to the longitudinal center axis. Mounted on the first tumbler is a first spiral shaped fin. Mounted on the exterior surface of the second tumbler is a second spiral shaped fin. Both fins are interconnected so when the tumblers rotate when the base is moved through water due to the water striking the fins that both tumblers are rotated at the same speed and in opposite directions due to interconnecting of the fins which prevents the first fin from rotating faster than the second fin which assures that the fishing lure moves in an upright position within the water.

A further embodiment of the present invention is where the basic embodiment is modified by there being mounted on the first tumbler a plurality of first spiral shaped fins.

A further embodiment of the present invention is where the just previous embodiment is modified by the first spiral shaped fins being evenly spaced apart.

A further embodiment of the present invention is where the just previous embodiment is modified by the first tumbler being defined as being cylindrical.

A further embodiment of the present invention is where the basic embodiment is modified by there being utilized a plurality of second spiral shaped fins mounted on the second tumbler.

A further embodiment of the present invention is where the just previous embodiment is modified by the second spiral shaped fins being evenly spaced apart.

A further embodiment of the present invention is where the just previous embodiment is modified by the second tumbler being defined as being cylindrical.

A further embodiment of the present invention is where the basic embodiment is modified by the first tumbler being formed hollow and fixedly mounted to the wall surface of the hollow chamber of the first tumbler are a series of spaced apart protrusions. A detached object is to be placed within the hollow chamber, and as the first tumbler rotates the detached object will bounce over the protrusions producing a noise which hopefully will be attractive to fish.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is an isometric view of the artificial fishing lure of the present invention showing such in the position as it would be in when moved through water;

FIG. 2 is a side elevational view of the artificial fishing lure of the present invention depicting the movement of the fishing lure through water;

FIG. 3 is a transverse cross-sectional view through the fishing lure of the present invention taken along line 3—3 of FIG. 2; and FIG. 4 is a transverse cross-sectional view through a modified version of tumbler which has a hollow chamber which has a detached object mounted in the hollow chamber.

DETAILED DESCRIPTION OF THE INVENTION

Referring particularly to the drawing, there is shown the artificial fishing lure 10 of this invention. The fishing lure 10 has an elongated base 12. The base 12 is relatively thin and has a bottom edge on which is mounted a pair of eyelets 14 and 16. Mounted on eyelet 14 is a fish hook 18. Mounted on eyelet 16 is a fish hook 20. The fish hooks 18 and 20 are suspendingly connected to their respective eyelets 14 and 16 so that the fish hooks are free to move relative to the base 12.

The elongated base 12 has fixedly mounted thereto and longitudinally extended therefrom a forward extension 22. Fixedly mounted on the extension 22 is an eyelet 24. The eyelet 24 is adapted to be connected to a fishing line 26 which, in most instances, will include a leader, which is not shown. The fishing line 26 is to function to drag the lure 10 through the water 28.

The elongated base 12 has formed therein a mounting chamber 30. The mounting chamber 30 is defined between a pair of stanchions 32 and 34. Within stanchion 32, there is located a first recess 36 and a second recess 38. Also within the stanchion 34 there is another first recess, which is not shown, and another second recess, which is also not shown. Each of the first recesses are in alignment with each other and a line drawn between the two will be parallel to a longitudinal center axis 40 of the elongated base 12. Also, if a line is drawn between the second recesses 38, that line will be located parallel to the longitudinal center axis 40 and will also be located parallel to the line that is drawn between the first recesses 36.

A first tumbler 42 terminates at opposite ends in shafts 44 and 46. A second tumbler 48 terminates at opposite ends in shafts 50 and 52. Both the tumblers 42 and 48 are shown to be cylindrical. However, other shapes for tumblers 42 and 48 may be employed, such as triangular, square, hexagonal, oblong and so forth. It is just that cylindrical seems to be preferred. Both the first tumbler 42 and the second tumbler 48 are rotatable relative to the stanchions 32 and 34.

Fixedly mounted on the exterior surface of the first tumbler 42 are a series of first evenly spaced apart spiral shaped fins 54. There are four in number of the fins 54 mounted on the first tumbler 42. Fixedly mounted on the second tumbler 48 are a plurality of second spiral shaped fins 56 which again are evenly spaced apart. Again, even spacing of the fins need not be necessary but is normally preferred. There are four in number of the first fins 54 and four in number of the second fins 56. However, it is considered to be within the scope of this invention that the number of the fins could be increased or decreased without departing from the scope of this invention.

The tumblers 42 and 48 are mounted on the stanchions 32 and 34 such that one of the fins 54 will be able to contact one of the fins 56. This means that as the fishing lure 10 is moved through the water and the fins 54 and 56 are contacted by the water that the tumblers 42 and 48 will be rotated in opposite directions, which is represented by arrows 58 and 60 in FIG. 3. If, per chance, a tumbler, such as tumbler 42, will have a tendency to rotate faster than tumbler 48, the fact that the fins interconnect will force the tumbler 48 to be rotated at the same speed by fin 54 physically contacting fin 56 and driving tumbler 48 at the same speed. The result is that the fishing lure 10 will not turn or twist within the water and will remain upright. Not only does this prevent twisting of the fishing line 26 but will also represent to the fish a more realistic minnow or small fish so as to encourage the fish to strike at the lure 10.

The close proximity of the tumblers 42 and 48 in conjunction with the fins 54 and 56 causes the surrounding water to be buffeted sending a low frequency sonic wave in an outward direction. The fishing can sense this sonic wave through their lateral lines which constitute the nerve lines in the body of each fish. This sonic wave is to give a representation to the fish that the bait fish might be in trouble and therefore inducing the fish to strike the lure 10.

Referring particularly to FIG. 4, there is shown a modified form of tumbler 62 shown in transverse cross-section. Mounted on the exterior surface of the tumbler 62 are a series of fins 64. The tumbler 62 includes a hollow chamber 66. Mounted within the sidewall of the hollow chamber 66 are a series of evenly spaced apart protrusions or bumps 68. Placed within the hollow chamber 66 is a detached object, such as a ball 70. If the tumblers 42 and 48 are constructed, as in FIG. 4, and as the tumblers 42 and 48 rotate, the movement of the ball over the bumps 68 produces a sound that may be attractive to fish and further inducing the fish to strike the lure 10.

What is claimed is:

1. An artificial fishing lure comprising:

an elongated base having a mounting chamber, said base being connected to an attachment which is designed to connect with a fishing lure which is to be used to move said base through water, said base to have a fish hook mounted thereon, said elongated housing having a longitudinal center axis;

said mounting chamber being formed between a pair of mounting stanchions with a single said stanchion located at each longitudinal end of a said mounting chamber, each said mounting stanchion having a first recess and a second recess, each said first recess of each said mounting stanchion being aligned longitudinally and parallel to said longitudinal center axis, each said second recess of each said mounting stanchion being aligned longitudinally and parallel to said longitudinal center axis;

a first cylindrical tumbler rotatably mounted between said first recesses, a second cylindrical tumbler rotatably mounted between said second recesses, said first tumbler having a plurality of spaced apart first spiral shaped fins mounted thereon, said second tumbler having a plurality of spaced apart second spiral shaped fins mounted thereon, said first fin interconnects with said second fin so when said tumbler rotates when said base is moved through water due to the water striking said fins both said tumblers are rotated at the same speed and in opposite directions due to the interconnecting of the fins which prevents said first fin from rotating faster than said second fin and unbalancing said fishing lure which assures that the fishing lure moves in an upright position within the water and does not turn over, spinning of said tumblers produces an attractive appearance to fish inducing a fish to strike at said fishing lure.

2. The artificial fishing lure as defined in claim 1 wherein:

said first spiral shaped fins being evenly spaced apart around said first tumbler.

3. The artificial fishing lure as defined in claim 2 wherein:

said second spiral shaped fins being evenly spaced apart around said second tumbler.

4. An artificial fishing lure comprising:

an elongated base having a mounting chamber, said base being connected to an attachment which is designed to connect with a fishing lure which is to be used to move said base through water, said base to have a fish hook mounted thereon, said elongated housing having a longitudinal center axis;

said mounting chamber being formed between a pair of mounting stanchions with a single said stanchion located at each longitudinal end of a said mounting chamber, each said mounting stanchion having a first recess and a second recess, each said first recess of each said mounting stanchion being aligned longitudinally and parallel to said longitudinal center axis, each said second recess of each said mounting stanchion being aligned longitudinally and parallel to said longitudinal center axis;

a first tumbler rotatably mounted between said first recesses, a second tumbler rotatably mounted between said second recesses, said first tumbler having a first spiral shaped fin mounted thereon, said second tumbler having a second spiral shaped fin mounted thereon, said first fin interconnects with said second fin so when said tumbler rotates when said base is moved through water due to the water striking said fins both said tumblers are rotated at the same speed and in opposite directions due to the interconnecting of the fins which prevents said first fin from rotating faster than said second fin and unbalancing said fishing lure which assures that the fishing lure moves in an upright position within the water and does not turn over, spinning of said tumblers produces an attractive appearance to fish inducing a fish to strike at said fishing lure, said first tumbler having a hollow chamber, said hollow chamber having a wall surface, at least one protrusion mounted on said wall surface, a detached object being mounted within said hollow chamber, as said first tumbler is rotated said detached object bounces into said bumps producing a noise which is to be attractive to fish further inducing the fish to strike the lure.

* * * * *